(12) United States Patent
Ramchandran

(10) Patent No.: US 11,340,906 B2
(45) Date of Patent: May 24, 2022

(54) SYSTEM AND METHOD FOR BUSINESS PROCESS MONITORING

(71) Applicant: Walmart Apollo, LLC, Bentonville, AR (US)

(72) Inventor: Ravi Ramchandran, Bengaluru (IN)

(73) Assignee: Walmart Apollo, LLC, Bentonville, AR (US)

( * ) Notice: Subject to any disclaimer, the term of this patent is extended or adjusted under 35 U.S.C. 154(b) by 360 days.

(21) Appl. No.: 16/593,533

(22) Filed: Oct. 4, 2019

(65) Prior Publication Data

US 2020/0110612 A1    Apr. 9, 2020

Related U.S. Application Data

(60) Provisional application No. 62/799,865, filed on Feb. 1, 2019.

(30) Foreign Application Priority Data

Oct. 4, 2018    (IN) .............. 201811037576

(51) Int. Cl.
*G06F 9/48* (2006.01)
*G06F 9/38* (2018.01)
(Continued)

(52) U.S. Cl.
CPC .......... *G06F 9/3836* (2013.01); *G06F 9/4881* (2013.01); *G06F 16/254* (2019.01); *G06Q 10/067* (2013.01)

(58) Field of Classification Search
CPC .. G06F 9/3836; G06F 9/4881; G06F 9/30083; G06F 9/4893; G06F 9/5094; G06F 16/25; G06F 16/252; G06F 16/254; G06F 16/256; G06F 16/258; G06F 1/32; G06F 1/3203; G06F 1/3206; G06F 1/3209; (Continued)

(56) References Cited

U.S. PATENT DOCUMENTS 7,487,494 B2    2/2009  Chan et al.
8,060,396 B1   11/2011  Bessler et al.
(Continued)

OTHER PUBLICATIONS

Ken Goodhope at al. "Building LinkedIn's Real-time Activity Data Pipeline" IEEE (Year: 2012).*
(Continued)

*Primary Examiner* — Hiren P Patel
(74) *Attorney, Agent, or Firm* — Duane Morris LLP; Manita Rawat

(57) ABSTRACT

Systems, methods, and computer-readable storage media for monitoring a pipeline of data without modifying code or otherwise impeding the pipeline. This is accomplished by identifying a class of software functions which modify other software function upon execution without modifying code for the other software functions, monitoring a pipeline of data to identify a plurality of jobs, the each job in the plurality of jobs comprising header information and body information, initiating, for each job in the plurality of jobs, a plurality of processes, modifying the plurality of processes based on the class, to yield advice modified processes, and outputting a status of the advice modified processes without modifying the pipeline.

17 Claims, 6 Drawing Sheets

(51) Int. Cl.
*G06Q 10/06* (2012.01)
*G06F 16/25* (2019.01)

(58) Field of Classification Search
CPC .... G06F 1/3256; G06F 1/3246; G06F 1/3278; G06F 15/825; G06F 11/3051; G06F 11/3089; G06F 2201/86; G06F 2201/865; G06F 2213/0008; G06F 5/06; G06F 8/316
USPC .............. 718/102–108; 712/18, 201, 225
See application file for complete search history.

(56) References Cited

U.S. PATENT DOCUMENTS

| | | | |
|---|---|---|---|
| 8,060,553 B2 | 11/2011 | Mamou et al. | |
| 8,326,680 B2 | 12/2012 | Nguyen et al. | |
| 8,805,716 B2 | 8/2014 | Michel et al. | |
| 2005/0222931 A1* | 10/2005 | Mamou | G06Q 10/10 705/35 |
| 2006/0265489 A1* | 11/2006 | Moore | H04L 69/40 709/223 |
| 2007/0162494 A1* | 7/2007 | Schneider | G06Q 10/08 |
| 2007/0234308 A1* | 10/2007 | Feigenbaum | G06F 8/316 717/130 |
| 2007/0265895 A1* | 11/2007 | Moore | G06Q 20/108 705/70 |
| 2007/0265900 A1* | 11/2007 | Moore | G06Q 10/0631 705/7.12 |
| 2008/0010545 A1 | 1/2008 | Tashiro et al. | |
| 2008/0288305 A1* | 11/2008 | LaLuzerne | G06Q 10/06 705/7.36 |
| 2008/0307390 A1* | 12/2008 | Marchant | G06F 8/315 717/114 |
| 2009/0144703 A1* | 6/2009 | Vairavan | G06F 8/20 717/122 |
| 2009/0192844 A1* | 7/2009 | Ramkumar | G06Q 10/06 705/7.15 |
| 2011/0238722 A1* | 9/2011 | Presley | G06F 9/548 709/201 |
| 2014/0281746 A1* | 9/2014 | Ercegovac | G06F 11/0778 714/48 |
| 2016/0070579 A1* | 3/2016 | Furtwangler | G06F 9/4488 717/116 |

OTHER PUBLICATIONS

Amin Jalali et al., "Multi-perspective Business Process Monitoring", 2013, pp. 1-16.
Microfocus, "Business Process Monitoring", 2018, pp. 1-9.

* cited by examiner

SYSTEM AND METHOD FOR BUSINESS PROCESS MONITORING

CROSS-REFERENCE TO RELATED APPLICATIONS

This patent application claims the priority to Indian Provisional Application No. 201811037576, filed Oct. 4, 2018, and U.S. Provisional Application No. 62/799,865, filed, Feb. 1, 2019, contents of which are incorporated by reference herein.

BACKGROUND

1. Technical Field

The present disclosure relates to business process monitoring, and more specifically to using aspect-oriented programming to modify how data in a pipeline is analyzed and interpreted without modifying the data itself.

2. Introduction

Aspect-oriented programming is a programming style which adds behavior to existing code (an advice) without modifying the code itself. This is accomplished by separately specifying which code is modified, thereby allowing programming behavior which is not a core aspect of the code to be added to the program behavior, without actually modifying the underlying code. This increased modularity in the code allows for aspects of data manipulation which impact multiple portions of a program to be modified using a single piece data, the advice.

"Big data" is used to refer to large and complex data sets which require unique forms of data processing. The analysis of business processes is one such area of big data. However, current methods and systems for monitoring and analyzing business processes require modification to the business processes themselves, their pipelines, and/or their associated analyses, in effect adding to the overall processing required while cluttering the pipeline with additional information.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

A method of performing the concepts disclosed herein can include: identifying a class of software functions which modify other software function upon execution without modifying code for the other software functions; monitoring a pipeline of data to identify a plurality of jobs, the each job in the plurality of jobs comprising header information and body information; initiating, for each job in the plurality of jobs, a plurality of processes; modifying the plurality of processes based on the class, to yield advice modified processes; and outputting a status (such as meta information business events) of the advice modified processes without modifying the pipeline.

A system configured to perform the concepts disclosed herein can include: a processor; and a computer-readable storage medium having instructions stored which, when executed by the processor, cause the processor to perform operations which include: identifying a class of software functions which modify other software function upon execution without modifying code for the other software functions; monitoring a pipeline of data to identify a plurality of jobs, the each job in the plurality of jobs comprising header information and body information; initiating, for each job in the plurality of jobs, a plurality of processes; modifying the plurality of processes based on the class, to yield advice modified processes; and outputting a status of the advice modified processes without modifying the pipeline.

A non-transitory computer-readable storage medium can be configured as disclosed herein to include steps which, when executed by a computing device, cause the computing device to perform operations which include: identifying a class of software functions which modify other software function upon execution without modifying code for the other software functions; monitoring a pipeline of data to identify a plurality of jobs, the each job in the plurality of jobs comprising header information and body information; initiating, for each job in the plurality of jobs, a plurality of processes; modifying the plurality of processes based on the class, to yield advice modified processes; and outputting a status of the advice modified processes without modifying the pipeline.

DETAILED DESCRIPTION

Figure 1:
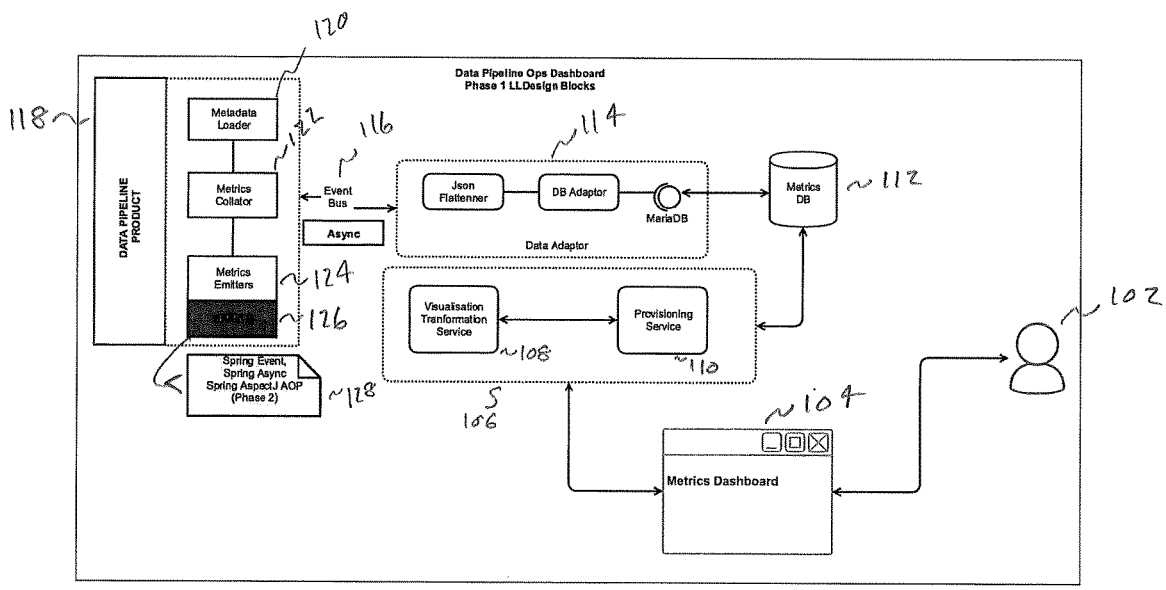
FIG. 1 illustrates an example design diagram.

Various embodiments of the disclosure are described in detail below. While specific implementations are described, it should be understood that this is done for illustration purposes only. Other components and configurations may be used without parting from the spirit and scope of the disclosure. The steps outlined herein are exemplary and can be implemented in any combination thereof, including combinations that exclude, add, or modify certain steps.

Processing data from multiple locations relies on a bus (such as a wire or fiber-optic cable) carrying packetized data. As the packetized data is received by a server or other processing location, the data is processed, meaning jobs are created to manipulate, analyze, and otherwise interpret the data received. When jobs are processed, progress reports on the status of the jobs can be provided, such that the current status of a given job may be determined. These status reports can take the form of events, with the result being that a pipeline of jobs, status/events information, and associated data can produce a tremendous amount of data. Trying to obtain metrics about this data, without further cluttering the pipeline with extraneous data, without modifying the pipeline to incorporate changes, and without slowing down the rate of data passing through the pipeline, is technically difficult.

For example, with large amounts of data being processed, using an inline filter of the pipeline data to read and identify what data is being processed will slow down the overall processing of the data, which is not ideal, particularly given the large amounts of data being processed. Likewise, inserting additional data into the pipeline (such as metadata) to describe the contents of the pipeline further clutters the pipeline, in effect adding to the amount of data to be processed.

By contrast, the methods and systems disclosed herein utilize event emissions which are asynchronous and do not impact the performance or processing of data within the pipeline (i.e., zero impact). These transparent event emissions can be generated using tags, such as the tag support offered in Java Runtime 1.8 and above. The tag allows annotation of a code block (such as a job, including a method, constructor, etc.) will result in an event being emitted at the end of the job or code block. The metadata associated with the event can be captured by interrogating a variable (preferable in the case of dynamic metadata), or can be passed directly from the annotation (preferable in the case of static metadata). Likewise, in some cases, emission support may require sending emissions or information associated with events within a code block or a job (rather than in a variable or as an emission). To do the monitoring disclosed herein, specific relationships between the events, the event tags and the correlation master can be required. These relationships can be illustrated in an Entity Relationship Diagram (ERD).

As the data in the pipeline is received and processed, the system can perform an Extract, Transform, and Load (ETL) process to move the data from the pipeline to a server, then utilize a predefined framework to execute each task or job in a predefined sequence. In some cases, this sequence can require that each task or job be performed sequentially, whereas in other cases the sequence can allow tasks or jobs to be performed in parallel.

As the data is being processed, real-time monitoring of jobs and statuses can occur. For example, the system can query the various jobs being processed to identify 'when will the last batch of data in the target item be available'? Or, 'Why is the data not yet updated in the target?' 'Which process is currently being executed?' 'At what stage did the execution fail'? 'How many Customers were created today?' 'What is the throughput of my job?' 'What is the rejection ration of my transactions?' Using legacy systems such queries are not possible, and instead users must manually identify a particular process and identify the status of that particular node. The disclosed system leverages existing infrastructure in a distinct manner, such that the calls made by a querying user are non-blocking calls which do not impede processing of the data in the pipeline.

Embodiments of the invention relate to a system of business process monitoring (BPM)/business activity monitoring (BAM) using Common aspect orienting programming (AOP) Business Emitters. In a data pipeline, transferring of data from point A to B depends on a quality matrix and rules around—moved to point B subsequently to point C. The data may be cleaned at every movements basis data rules (not NULL/could be business rules, order should have at least one line number, etc.) The cleanest data is then stored. This data is used to create data a dashboard report for business requirements (for example, the CTO wants to see how many scans in the last one month). A lot of critical data can be viewed. As the data gets filtered/cleaned, a lot of data gets eliminated; Someone needs to go into each data to check frequency of failure of rules. Extracting metadata of any process is, traditionally, a reactive process.

Embodiments of the invention allow: Creation of the dashboard with real time data from the processes; Attachment of an emitter to each process. The emitter can be made to emit specific meta information (throughput, matrix from the job, speed, how many records passed/failed, etc.) about the business process. The information from the process is stored in a persistent aggregation store (time series database) and a dashboard is created out of the aggregation. This helps in monitoring business process in real time.

Embodiments of the invention include:

Business process monitoring with Aspect Oriented Programming (AOP).

In big data pipeline—aspect oriented programming—change bytecode while compilation.

Adding an AOP agent—added when high level language is translated to a low level language—the emitter is attached (as a glue/binder) to an existing big data pipeline. The emitter now resides as a first class resident base. All the data from the pipeline can be obtained.

Send out an event (meta information) to an AOP receiver. Specifically, Emitter Encoded into ByteCode has the ability to mine deep into a Business Process and emit Business Meta Events, and Operational Meta Events.

Disparate Events are collated by a Emitter Receiver, the Event with the Business and Operational Metadata, can be intelligently mined to create a Context which can be used for Business KQI/KQI Dashboard, Business Process Efficiency, Process Optimization.

FIG. 1 illustrates an example design diagram. In this example design, a user 102 interacts with a metrics dashboard 104 in a user interface to inquire about the status of data within a data pipeline 118. The metrics dashboard 104 communicates with a backend system 106 which includes a visualization transformation system 108 and a provisioning service 110, the provisioning service 110 extracting data from a metrics database 112 and the visualization transformation system 108 working with the provisioning service 110 to transform the data received from the metrics database 112 into usable data on the metrics dashboard 104. The metrics database interacts with a data adaptor 114, such as a JSON flattener which flattens the hierarchies obtained from the data pipeline 118, then adapts the flattened hierarchies to the particular configuration required by the metrics database 112 or other databases. The data pipeline 118 can be read and associated data can be generated using a metadata loader 120, a metrics collator 122, and metrics emitters 124. As jobs are processed and tagged, tags 126 can be added to the collected data, with the tags including additional data 128 about the jobs or processes received.

Figure 2:
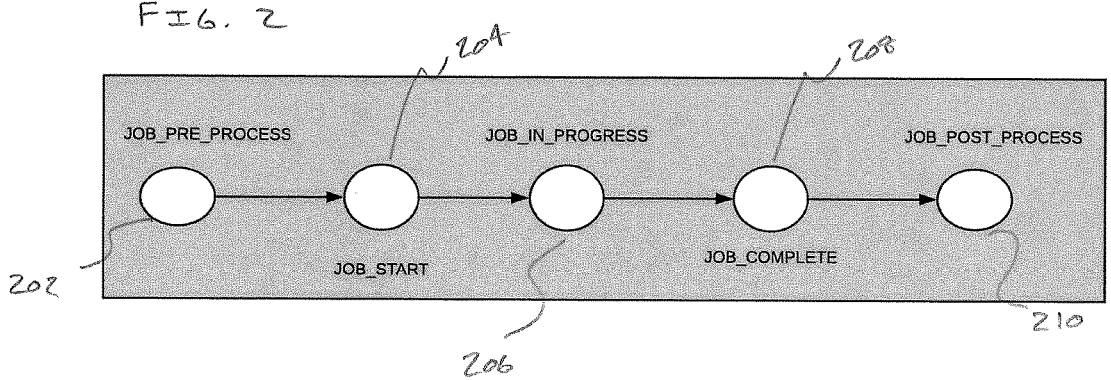
FIG. 2 illustrates an example event lifecycle.

FIG. 2 illustrates an example event lifecycle. In this example, the data within a pipeline has been read and determined to include a job. The system can generate "events" where notifications, data, etc., can be provided at distinct points in the job. Exemplary points can include a pre-process 202, the job start 204, the job progress 206, a job completion 208, and a job post process report 210.

Figure 3:
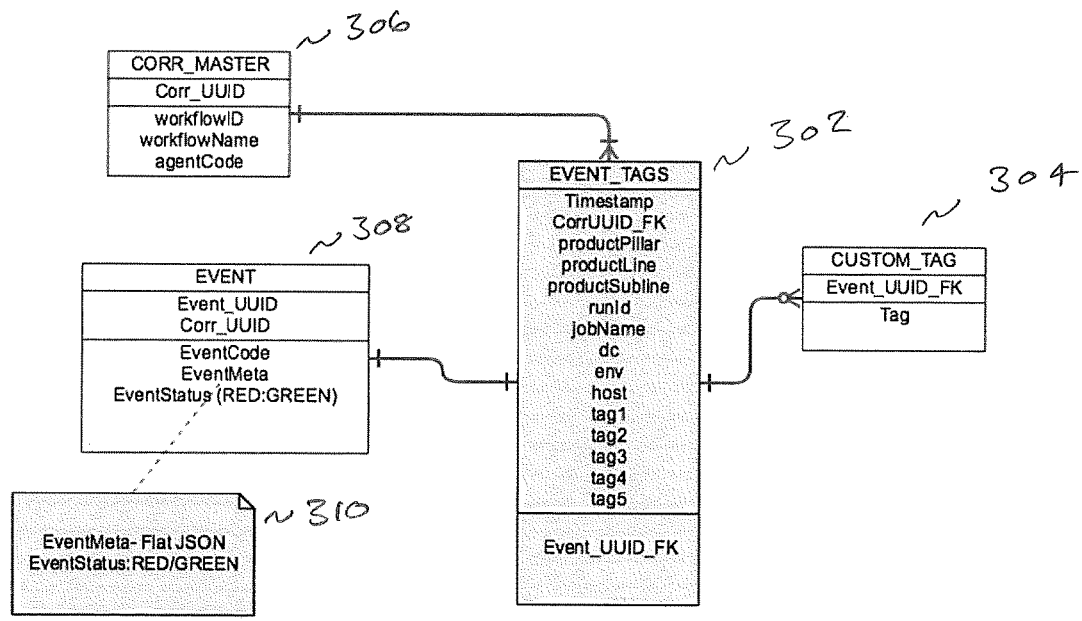
FIG. 3 illustrates an example entity-relationship diagram model for monitoring.

FIG. 3 illustrates an example entity-relationship diagram model for monitoring, and more specifically an entity-relationship diagram model for monitoring data within a data pipeline. In this example, an aspect affects multiple pieces of code without modifying the code, such that the jobs created by that data are tagged in a particular way with event tags 302. These event tags 302 can have a correlation 306 with other tags, variables, or code elements associated with the data in the pipeline, other jobs, or software applications. The event tags themselves can be customized 304, such that the specific data received can be used to create custom jobs and/or results. The event tags 302 can be used to create jobs which in turn create (as they are executed) events 308. In some cases, the event alarm or output can be specified 310 as JSON (JavaScript Object Notation), a binary indication (1 or 0, red or green, etc.) indicating that the event is occurring in a particular way.

Figure 4:
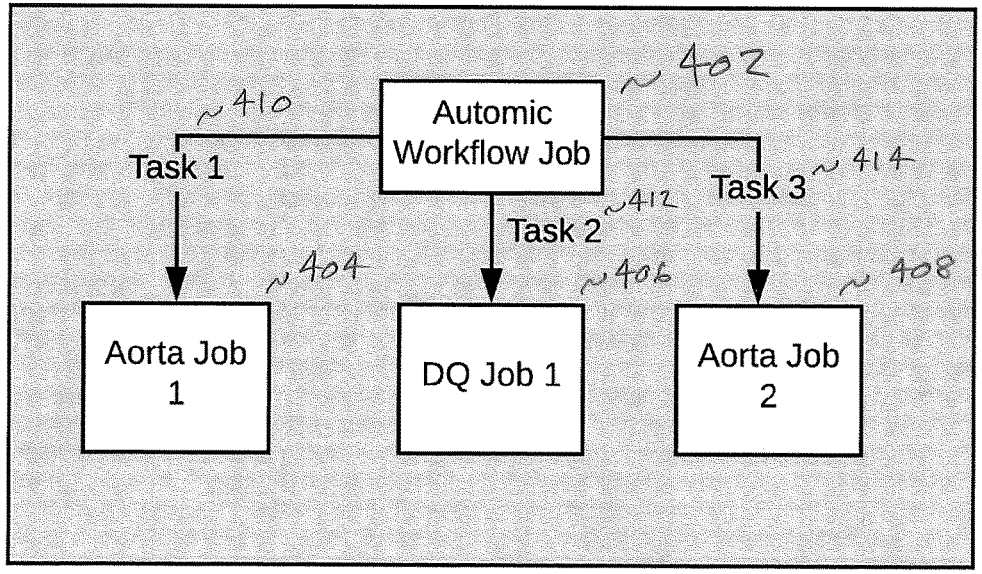
FIG. 4 illustrates an example task sequence.

FIG. 4 illustrates an example task sequence. In this example, data is moved as part of an Extract, Transform, and Load (ETL) process from different sources into the cloud, or more precisely one or more servers. As illustrated, the system is coordinated using an automatic scheduler 402, which executes each task 410, 412, 414 in a predefined sequence, resulting in jobs 404, 406, 408 which are similarly executed in a particular sequence. As illustrated, this is a disconnected run of a process, such that there is no context exchange between a workflow, the associated tasks, and data pipeline jobs. However, in other (connected) implementations, there could be a context exchange between the workflow, the associated tasks, and the data pipeline jobs to indicate what type of data is being identified and exchanged.

Figure 5:
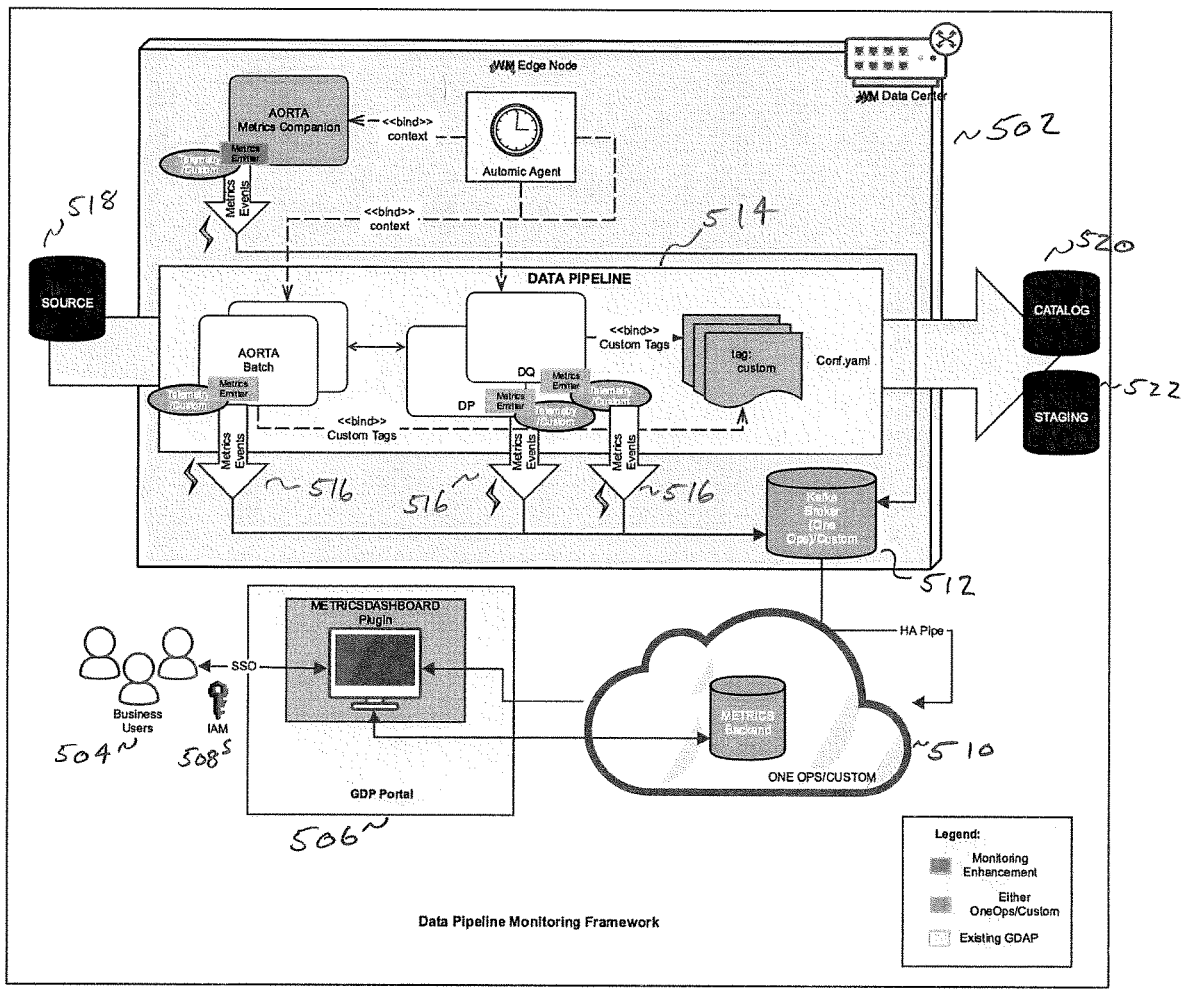
FIG. 5 illustrates an example data pipeline monitoring framework.

FIG. 5 illustrates an example data pipeline monitoring framework 500. In this example, a data center 502 houses a data pipeline 514. The data pipeline 514 receives data from a source 518 (or sources), and uses that data either as a catalog 520 for future reference, or to stage 522 projects (jobs) for implementation. Users 504 access the data pipeline monitoring through a portal 506, which can access metrics associated with the data pipeline 514 in the cloud 510, or more precisely on servers which have accessed data about the pipeline. The pipeline data being accessed by the cloud metrics 510 can be stored in a database 512 in the data center 502. This pipeline data can be updated with metrics of events 516 occurring within the data pipeline 514. For example, as the data is received from the source 518 into the data pipeline 514, the system can batch the data, identify tags to be inserted, and identify metrics or events to be processed.

Figure 6:
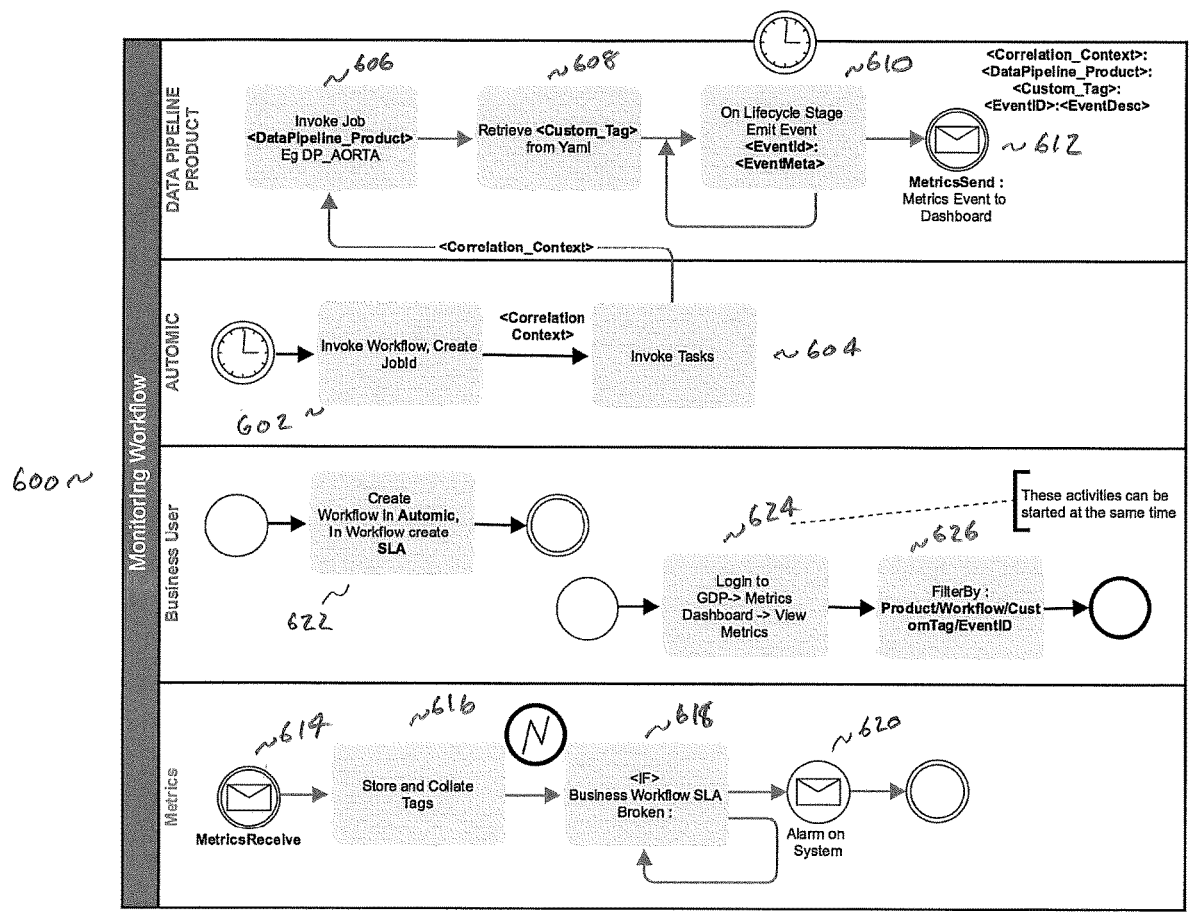
FIG. 6 illustrates an example monitoring workflow.

FIG. 6 illustrates an example monitoring workflow 600. In this example, as the data in the pipeline is received and processed, jobs are created 602 within a scheduler (Automic) which invoke tasks 604. These tasks invoke jobs 606 within the data pipeline product and retrieve custom tags from a configuration file 608. The jobs emit event notifications 610 over the lifecycle of the job, and eventually transmit metrics about the jobs to a dashboard 612.

The metrics are received 614 by the metrics dashboard, a database, or other collection point, which stores and collates tags 616. If the business workflow is broken 618, the system can identify the repetition within the system and issue an alarm 620 for correction.

In the case of a business user, the user can create their own workflow Service Level Agreement (SLA) indicating what a user will receive at what point. In addition, the business user can login 624 to the metrics dashboard to view the metrics, then filter the metrics 626 as needed.

Figure 7:
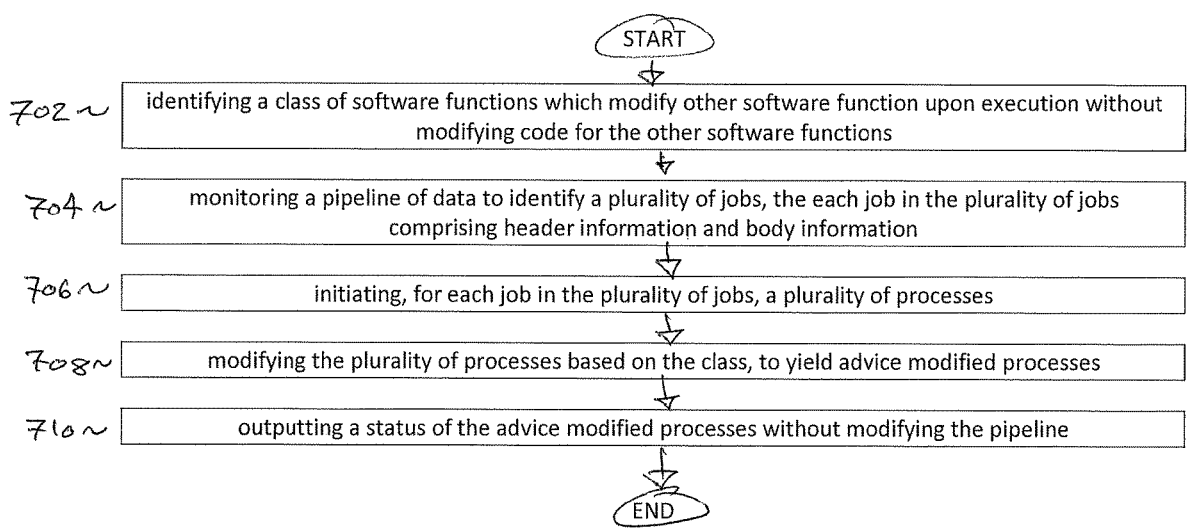
FIG. 7 illustrates an example method embodiment.

FIG. 7 illustrates an example method embodiment. In this example, the system identifies a class of software functions which modify other software function upon execution without modifying code for the other software functions (702). The system monitors a pipeline of data to identify a plurality of jobs, the each job in the plurality of jobs comprising header information and body information (704) and initiates, for each job in the plurality of jobs, a plurality of processes (706). The system modifies the plurality of processes based on the class, to yield class modified processes (708) and outputs a status of the class modified processes without modifying the pipeline.

The status output by the system can be meta information, such as a context describing one or more actions, business activity, and business metadata.

The pipeline, as described herein, can be one or more wires (such as a copper wire) or fiber optic cables. When the status is output, this can be output to a distinct channel within the same wire/fiber optic cable the original data is stored in, or it can be output to a distinct wire/fiber optic cable altogether. That is, the status can be output to a distinct communication medium than the original pipeline, the distinct communication medium being one of a distinct wire or a distinct fiber optic cable than the pipeline.

In some configurations, the monitoring described can performed by: reading the data within the pipeline at a first level of granularity, to yield granular data; combining the granular data to form combined data; and identifying a job associated with the combined data, wherein the job is part of the plurality of jobs identified by the monitoring. In such configurations, the first level of granularity can be, for example, a byte of data.

In some cases, the method can be further augmented to include: combining the status with a plurality of status updates, to yield a combined status; generating a context of the pipeline of data based on the combined status; and modifying a job in the plurality of jobs based on the context, to yield a modified job, the modified job requiring a change in processing power. Moreover, in such cases, the change in processing power can be a reduction in processing power required.

Figure 8:
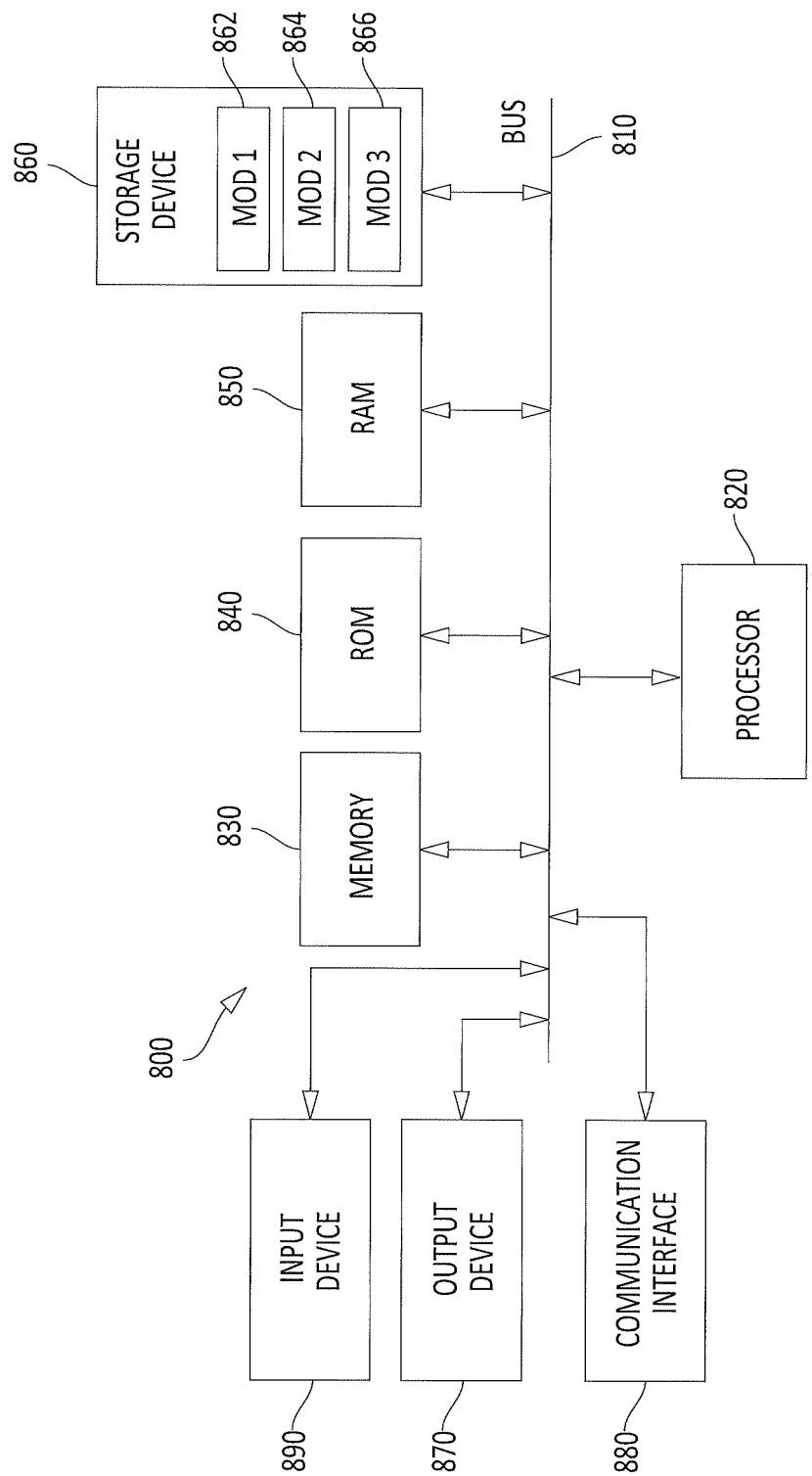
FIG. 8 illustrates an exemplary computer system.

With reference to FIG. 8, an exemplary system includes a general-purpose computing device 800, including a processing unit (CPU or processor) 820 and a system bus 810 that couples various system components including the system memory 830 such as read-only memory (ROM) 840 and random access memory (RAM) 850 to the processor 820. The system 800 can include a cache of high-speed memory connected directly with, in close proximity to, or integrated as part of the processor 820. The system 800 copies data from the memory 830 and/or the storage device 860 to the cache for quick access by the processor 820. In this way, the cache provides a performance boost that avoids processor 820 delays while waiting for data. These and other modules can control or be configured to control the processor 820 to perform various actions. Other system memory 830 may be available for use as well. The memory 830 can include multiple different types of memory with different performance characteristics. It can be appreciated that the disclosure may operate on a computing device 800 with more than one processor 820 or on a group or cluster of computing devices networked together to provide greater processing capability. The processor 820 can include any general purpose processor and a hardware module or software module, such as module 1 862, module 2 864, and module 3 866 stored in storage device 860, configured to control the processor 820 as well as a special-purpose processor where software instructions are incorporated into the actual processor design. The processor 820 may essentially be a completely self-contained computing system, containing multiple cores or processors, a bus, memory controller, cache, etc. A multi-core processor may be symmetric or asymmetric.

The system bus 810 may be any of several types of bus structures including a memory bus or memory controller, a peripheral bus, and a local bus using any of a variety of bus architectures. A basic input/output (BIOS) stored in ROM 840 or the like, may provide the basic routine that helps to transfer information between elements within the computing device 800, such as during start-up. The computing device 800 further includes storage devices 860 such as a hard disk drive, a magnetic disk drive, an optical disk drive, tape drive or the like. The storage device 860 can include software modules 862, 864, 866 for controlling the processor 820. Other hardware or software modules are contemplated. The storage device 860 is connected to the system bus 810 by a drive interface. The drives and the associated computer-readable storage media provide nonvolatile storage of computer-readable instructions, data structures, program modules and other data for the computing device 800. In one aspect, a hardware module that performs a particular function includes the software component stored in a tangible computer-readable storage medium in connection with the necessary hardware components, such as the processor 820, bus 810, display 870, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 800 is a small, handheld computing device, a desktop computer, or a computer server.

Although the exemplary embodiment described herein employs the hard disk 860, other types of computer-readable media which can store data that are accessible by a computer, such as magnetic cassettes, flash memory cards, digital versatile disks, cartridges, random access memories (RAMs) 850, and read-only memory (ROM) 840, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 800, an input device 890 represents any number of input mechanisms, such as a microphone for speech, a touch-sensitive screen for gesture or graphical input, keyboard, mouse, motion input, speech and so forth. An output device 870 can also be one or more of a number of output mechanisms known to those of skill in the art. In some instances, multimodal systems enable a user to provide multiple types of input to communicate with the computing device 800. The communications interface 880 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z" or "at least one or more of X, Y, or Z" are intended to convey a single item (just X, or just Y, or just Z) or multiple items (i.e., {X and Y}, {Y and Z}, or {X, Y, and Z}). "At least one of" is not intended to convey a requirement that each possible item must be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

I claim:

1. A computer-implemented method comprising:
identifying, by a processor, a class of software functions which modify other software functions upon execution without modifying code for the other software functions;
monitoring, by the processor, data of a data pipeline to identify a plurality of jobs, each job of the plurality of jobs comprising header information and body information;
reading the data within the data pipeline at a first level of granularity, to yield granular data;
combining the granular data to form combined data;
identifying a job associated with the combined data, wherein the job is part of the plurality of jobs identified by the monitoring;
initiating, by the processor and for each job in the plurality of jobs, a plurality of processes;
modifying, by the processor and for each job in the plurality of jobs, the plurality of processes based on the class, to yield advice modified processes; and
outputting, by the processor and for each job in the plurality of jobs, a status of the corresponding advice modified processes without modifying the data of the data pipeline.

2. The method of claim 1, the data pipeline comprising one of a wire or a fiber optic cable, wherein the status is output to a distinct channel than the data within the data pipeline.

3. The method of claim 1, the data pipeline comprising one of a wire or a fiber optic cable, wherein the status is output to a distinct communication medium, the distinct communication medium comprising one of a distinct wire or a distinct fiber optic cable than the data pipeline.

4. The method of claim 1, wherein the first level of granularity is a byte of data.

5. The method of claim 1, further comprising:
combining the status with a plurality of status updates, to yield a combined status;
generating a context of the data pipeline based on the combined status; and
modifying a job in the plurality of jobs based on the context, to yield a modified job, the modified job requiring a change in processing power.

6. The method of claim 5, wherein the change in processing power is a reduction in processing power required.

7. A system comprising:
a processor; and
a memory resource storing instructions, which, when executed by the processor, cause the processor to perform operations comprising:
identifying a class of software functions which modify other software functions upon execution without modifying code for the other software functions;
monitoring data of a data pipeline to identify a plurality of jobs, each job of the plurality of jobs comprising header information and body information;
reading the data within the data pipeline at a first level of granularity, to yield granular data;
combining the granular data to form combined data;
identifying a job associated with the combined data, wherein the job is part of the plurality of jobs identified by the monitoring;
initiating, for each job in the plurality of jobs, a plurality of processes;

modifying, for each job of the plurality of jobs, the plurality of processes based on the class, to yield advice modified processes; and outputting, for each job of the plurality of jobs, a status of the corresponding advice modified processes without modifying the data of the data pipeline.

8. The system of claim 7, the data pipeline comprising one of a wire or a fiber optic cable, wherein the status is output to a distinct channel than the data within the data pipeline.

9. The system of claim 7, the data pipeline comprising one of a wire or a fiber optic cable, wherein the status is output to a distinct communication medium, the distinct communication medium comprising one of a distinct wire or a distinct fiber optic cable than the data pipeline.

10. The system of claim 7, wherein the first level of granularity is a byte of data.

11. The system of claim 7, the memory resource having additional instructions stored which, when executed by the processor, cause the processor to perform operations comprising:

combining the status with a plurality of status updates, to yield a combined status;

generating a context of the data pipeline based on the combined status; and modifying a job in the plurality of jobs based on the context, to yield a modified job, the modified job requiring a change in processing power.

12. The system of claim 11, wherein the change in processing power is a reduction in processing power required.

13. A non-transitory computer-readable storage medium having instructions stored which, when executed by a processor, cause the processor to perform operations comprising:

identifying a class of software functions which modify other software functions upon execution without modifying code for the other software functions;

monitoring data of a data pipeline to identify a plurality of jobs, each job of the plurality of jobs comprising header information and body information;

reading the data within the data pipeline at a first level of granularity, to yield granular data;

combining the granular data to form combined data;

identifying a job associated with the combined data, wherein the job is part of the plurality of jobs identified by the monitoring;

initiating, for each job in the plurality of jobs, a plurality of processes;

modifying, for each job of the plurality of jobs, the plurality of processes based on the class, to yield advice modified processes; and outputting, for each job of the plurality of jobs, a status of the corresponding advice modified processes without modifying the data of the data pipeline.

14. The non-transitory computer-readable storage medium of claim 13, the data pipeline comprising one of a wire or a fiber optic cable, wherein the status is output to a distinct channel than the data within the data pipeline.

15. The non-transitory computer-readable storage medium of claim 13, the data pipeline comprising one of a wire or a fiber optic cable, wherein the status is output to a distinct communication medium, the distinct communication medium comprising one of a distinct wire or a distinct fiber optic cable than the data pipeline.

16. The non-transitory computer-readable storage medium of claim 13, wherein the first level of granularity is a byte of data.

17. The non-transitory computer-readable storage medium of claim 13, having additional instructions stored which, when executed by the processor, cause the processor to perform operations comprising:

combining the status with a plurality of status updates, to yield a combined status; generating a context of the data pipeline based on the combined status; and modifying a job in the plurality of jobs based on the context, to yield a modified job, the modified job requiring a change in processing power.

* * * * *